(12) United States Patent
Erbar et al.

(10) Patent No.: US 7,243,135 B1
(45) Date of Patent: Jul. 10, 2007

(54) METHOD FOR FINDING AN INTERNET OR E-MAIL ADDRESS

(75) Inventors: Maximilian Erbar, Villingen-Schwenningen (DE); Reinhard Lachenmaier, Trossingen (DE); Xavier Lebegue, Paris (FR)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/623,404

(22) PCT Filed: Mar. 2, 1999

(86) PCT No.: PCT/EP99/01340

§ 371 (c)(1),
(2), (4) Date: Jun. 18, 2001

(87) PCT Pub. No.: WO99/48292

PCT Pub. Date: Sep. 23, 1999

(30) Foreign Application Priority Data

Mar. 13, 1998 (DE) .................................. 198 11 103

(51) Int. Cl.
*G06F 15/16* (2006.01)
(52) U.S. Cl. .................. 709/217; 725/110; 725/112
(58) Field of Classification Search ............... 701/201; 707/104.1, 3; 709/203, 201, 245, 206, 202, 709/217–227; 725/105, 112, 113, 110, 109
See application file for complete search history.

(56) References Cited

U.S. PATENT DOCUMENTS 5,675,390 A * 10/1997 Schindler et al. ........... 345/717

5,675,788 A * 10/1997 Husick et al. ........... 707/104.1

(Continued)

FOREIGN PATENT DOCUMENTS

DE            4427046            2/1996

(Continued)

OTHER PUBLICATIONS

Jakobsson, M.; "Autocoimpletion in Full Text Transaction Entry: A Method for Humanized Input"; CHI 1986 Proceedings; ACM 89791-180-6/86/0400, Apr. 1986.*

(Continued)

*Primary Examiner*—Moustafa M. Meky
(74) *Attorney, Agent, or Firm*—Joseph J. Laks; Ronald H. Kurdyla; Joel M. Fogelson

(57) ABSTRACT

The invention is based on a method for finding an Internet or E-mail address.

Internet or E-mail addresses are noted in the content of many teletext pages regardless of whether they contain advertising or information. The addresses are currently transmitted within the visible area of a teletext page so that the user must normally copy them and enter them into an Internet browser.

The invention is based on the object of creating a simplified method for finding an Internet or E-mail address.

The method according to the invention for finding an Internet or E-mail address which is reproduced in a teletext system, comprising visible areas and non-visible areas of the teletext system, a selection unit, a control unit and a link unit, is distinguished by the fact that the address in the visible area is selected by the selection unit, the control unit recognizes the selected address, the control unit accepts and/or modifies the address format and the address is selected via the link unit.

17 Claims, 2 Drawing Sheets

U.S. PATENT DOCUMENTS

| | | | |
|---|---|---|---|
| 5,774,666 A * | 6/1998 | Portuesi | 725/112 |
| 5,778,181 A * | 7/1998 | Hidary et al. | 725/112 |
| 5,818,935 A | 10/1998 | Maa | |
| 5,948,040 A * | 9/1999 | DeLorme et al. | 701/201 |
| 5,977,969 A * | 11/1999 | DiAngelo | 715/507 |
| 5,987,029 A * | 11/1999 | Kotani et al. | 370/389 |
| 6,018,764 A * | 1/2000 | Field et al. | 709/217 |
| 6,041,324 A * | 3/2000 | Earl et al. | 707/104.1 |
| 6,058,430 A * | 5/2000 | Kaplan | 709/245 |
| 6,061,719 A * | 5/2000 | Bendinelli et al. | 725/112 |
| 6,092,100 A * | 7/2000 | Berstis et al. | 709/203 |
| 6,094,665 A * | 7/2000 | Lyons et al. | 715/531 |
| 6,097,375 A * | 8/2000 | Byford | 345/169 |
| 6,163,316 A * | 12/2000 | Killian | 715/721 |
| 6,219,709 B1 * | 4/2001 | Byford | 709/227 |
| 6,229,532 B1 * | 5/2001 | Fujii | 715/501.1 |
| 6,430,743 B1 * | 8/2002 | Matsuura | 725/112 |
| 6,510,557 B1 * | 1/2003 | Thrift | 725/110 |
| 6,637,032 B1 * | 10/2003 | Feinleib | 725/110 |
| 6,658,662 B1 * | 12/2003 | Nielsen | 725/113 |
| 6,785,905 B1 * | 8/2004 | Nishioka et al. | 725/110 |
| 6,792,618 B1 * | 9/2004 | Bendinelli et al. | 725/112 |
| 6,816,201 B1 * | 11/2004 | Fang et al. | 725/112 |
| 7,117,522 B2 * | 10/2006 | Nishioka et al. | 725/110 |
| 2006/0271980 A1 * | 11/2006 | Mankovitz | 725/90 |

FOREIGN PATENT DOCUMENTS

| | | |
|---|---|---|
| NL | EP 0723369 A1 * | 7/1996 |
| WO | WO 97/22207 | 6/1997 |
| WO | WO 97/33434 | 9/1997 |
| WO | WO 97/41690 | 11/1997 |
| WO | 97/49044 | 12/1997 |

OTHER PUBLICATIONS

Berners-Lee, T. et al.; "Uniform Resource Locators (URL)"; Request for Comments (RFC) 1738; Dec. 1994.*

Panabaker, R. et al.; "The Transmission of IP Over the Vertical Blanking Interval of a Television Signal"; Request for Comment (RFC) 2728; Nov. 1999.*

Funkschau, Jun. 1996, Mar. 1, 1996, pp. 70-75.

* cited by examiner

METHOD FOR FINDING AN INTERNET OR E-MAIL ADDRESS

This application claims the benefit under 35 U.S.C. § 365 of International Application PCT/EP99/01340 filed Mar. 2, 1999, which claims the benefit of German Application No. 198 11 103.7 filed Mar. 13, 1998.

FIELD OF INVENTION

The invention is based on a method for finding an Internet or E-mail address.

BACKGROUND OF THE INVENTION

Internet or E-mail addresses are noted in the content of many Teletext pages regardless of whether they contain advertising or information. The addresses are currently transmitted within the visible area of a Teletext page so that the user must normally copy them and enter them into an Internet browser.

SUMMARY OF THE INVENTION

The invention is based on the object of creating a simplified method for finding an Internet or E-mail address. This object is achieved by the features of the invention specified in the claims. Advantageous further developments of the invention are specified in the subclaims.

The method according to the invention for finding an Internet or E-mail address which is reproduced in a teletext system, comprising visible areas and non-visible areas of the teletext system, a selection unit, a control unit and a link unit, is distinguished by the fact that the address in the visible area is selected by the selection unit, the control unit recognizes the selected address, the control unit accepts and/or modifies the address format and the address is selected via the link unit.

The method according to the invention provides the user with the advantage that he does not need to copy the Internet address which he sees in the teletext. This provides him with faster access.

Furthermore, the method can be characterized in that the control unit recognizes the address by means of obvious address information.

If the user is not able to select the address required by him with the aid of a cursor or another unit for highlighting the address, it is possible for the system itself to emphasize an Internet address. This means that the Internet address in the teletext is rendered visible for the user and he can let this address be selected by means of an acknowledgement key on a remote control unit. Obvious address information is, for example, Internet address strings such as "http://", "www." or subsequent strings such as, for example, ".com" or ".de" or strings which are preferably separated only by dots (without spaces). The control unit can use this information to perform highlighting. For example, if the highlighting were to begin at "www" and end at ".com", the control unit could then translate the address thus found and use it for selection. Or if the highlighting begins at "www", the end can be determined in accordance with the extraction algorithm described below. The control unit can then translate the address thus found and use it for selection.

Furthermore, the method can be distinguished by the fact that the address is displayed in the visible area and the non-visible area contains address information which is used by the control unit for calling up the address.

If the translation of the Internet address is to be omitted, it is possible to store the address information in the non-visible area so that it could be found there. This means that there is a link between the visible teletext information and the non-visible Internet address which is then used by the control unit for selection.

It is also possible for a user to highlight the address by means of a highlighting unit and this address is to be transferred to the control unit.

The highlighting unit has the advantage that the user himself can highlight the part of the address relevant to him. For example, in the case of a long Internet address where, however, only the home page is of interest to the user, only the first part of the address needs to be highlighted which, as a rule, applies to the home page. In this manner, the user will not have to reach the home page via the detour of a subpage.

Furthermore, the method can be distinguished by the fact that the control unit contains a memory and/or that there is a link to a memory for storing addresses and/or retrieving addresses.

If the control unit contains a memory and/or accesses a memory, this would have the advantage that, as soon as the control unit recognizes an address in the teletext page, it can store it in the memory. The memory can also be used for checking whether the address selected by the control unit is correct. If, for example, an Internet address is not specified completely, it is possible to find it completely by means of a comparison with the addresses in a memory. This memory can be filled with many Internet addresses right from the start in order thus to provide the prerequisite that the correct Internet address will be found.

Using the control unit, the user can also perform a search algorithm so that he can find in this manner the address which he does not reliably know.

A circuit for finding an Internet or E-mail address which is reproduced in a teletext system comprising a selection unit, a control unit and a link unit is distinguished by the fact that the selection unit recognizes the address and the link unit sets up the link as soon as the control unit requests it to do so.

Furthermore, the circuit can contain a selection unit and a link unit in the control unit.

Furthermore, the circuit can be distinguished by the fact that the control unit contains a memory and/or that there is a link to a memory.

In the text which follows, possibilities will again be explained by means of which Internet or E-mail addresses can be found.

The Internet or E-mail address(es) will be called addresses in the text which follows. The teletext page(s) is (are) called page(s) in the text which follows. They are designated by magazine numbers and a decimal page number. The corresponding line in the magazine is identified by a numerical value. e.g. x/5 is line 5 in a magazine x. teletext pages with a hexadecimal page number are called "ghost-page".

Page-Related Addresses

The page-related addresses must establish their reference to the page by at least one reference also being transmitted in one of the data packets belonging to this page.

Visible area: x/1–x/23

The addresses which are transmitted in the visible area of the page do not have an identification which identify them as addresses. Such a page is then searched for address-specific identifiers. The names of the addresses are subject to the familiar restrictions of the character set according to the teletext specification (European Broadcasting Union: Interim Technical Document SPB 492). Thus, the characters @ ("at") and ~ (tilde) are not available in every national character set. Although it would be possible to generate them by x/26, they are, as a rule, replaced, namely @ by (at) and ~ by (*). The data themselves are sensitive to interference along the transmission path since they are only protected by one parity bit per 7 data bits.

Non-Visible Area: x/27 to x/31

As a rule, such additional data are protected by hamming coding. The character codes which contain colour attributes and others in the visible area can be used for completing the character set. The following forms are conceivable for optimizing the transmission:

direct entry of the addresses, if necessary with row/column address for display within the visible area;

reference to an address table which is transmitted in a separate "ghost page" (see under "sender-related addresses"). If a navigation medium (mouse, pointing device, tab stop) points to such an entry or reference, the complete address can be displayed in a superimposed window (free or docked), or can be visually emphasized if it is already displayed on the screen (as in the case of "page-related addresses").

x/27

The functions having designation codes 0–7 are used for transmitting links to other teletext pages. The functions can also be used in this sense for looking for the corresponding address.

x/28

The functions having designation codes 0–4 are used. The functions having designation codes 5–15 can be freely specified for pointing to an address or to contain one.

x/30

The functions having designation codes 0–3 are used in magazine 8.

x/31

The packets are used for data services in magazines 1–3 and 8.

Sender-Related Addresses

Addresses which can be called up from each end must be transmitted and stored in page-independent tables. Such tables are usually transmitted with hexadecimal page numbers and are thus not directly selectable by the user.

x/28

The x/28 data to be defined can also contain references to "ghost pages". These can be handled like data pages of teletext presentation level 2.5 (described in ETS (European Telecommunication Standard) 300 706 issued by the European Telecommunications Standards Institute, F-06921 Sophia Antipolis).

Application

An application in the sense of ETS 300 708 is a non-teletext service which is transmitted in accordance with the transmission specification of teletext. Such a one can also contain addresses in a form which enables or necessitates the addresses to be administered independently of the teletext.

Separate Application

The access to the Internet can be defined as a separate application. This requires that the addresses are administered independently of the teletext.

Existing Application

Within an electronic program guide (EPG), addressed can be named as pure text characters in the short or long information relating to the individual PIs (Program Information) (compare "visible area"; it differs from a teletext in the generation of the special characters: by x/26 in teletext and by ESC sequences in EPG).

Extraction Algorithm

The transmitted addresses, as described above in the section "visible area", need a special extraction algorithm. This is capable of recognizing addresses, if necessary, over line breaks. In this connection, attention must be paid to various conditions.

If it is assumed that texts which are written over a number of lines are continued in the first possible column of the next line following, the column number in the continuation line is smaller than or equal to the starting column.

If it is assumed that texts are written in various colour combinations (foreground-background), it must be assumed that a start item is continued in the same colour combination. Thus, all areas with different colours and all mosaic graphics areas must be ignored (mosaic colour=text colour)

Address Generation

Apart from the method of extracting complete Internet addresses from the received data, it would also be possible to generate Internet addresses by oneself from fractions. For this purpose, the user can select a part of the displayed text by mouse or pointing device.

If the selected text is free of characters which cannot occur in an Internet address such as, for example, a space, an attempt is made to find a valid Internet address in the following manner:

a) by prefixing a string which determines the type of Internet address such as, e.g. "www.", "ftp." or "gopher."

b) by appending a string which represents the so-called domain name such as, e.g. ".com", ".edu", ".gov" or of one of dynamic probability of use and/or stored for the user in accordance with geographic location such as, e.g. ".de", ".fr", ".it"

c) by arbitrary combinations of the two above-mentioned measures d) by progressive shortening of the text by the last "/" in each case and the subsequent text.

In each case, the control unit transfers an Internet address thus generated to the Internet browser. If an address is recognized as valid, i.e. the browser is capable of reaching the Internet address without errors, the current address is entered into a list of valid Internet addresses. In this time, the browser can, for example, display the content of the address first recognized as valid. If more than one Internet address is recognized as valid, the user is presented with a list containing these addresses for selection. If only one valid address is found, the browser requests the content of this address. If no valid address is found for the selected text or if the text contains characters which cannot occur in an Internet address, this text is transferred to the browser with the command to search the Internet for the text or for logically combined parts of the text by means of the search engine set as a standard. Thus, for example, Internet pages can be searched for which contain each or at least one of the words of a selected text.

Navigation

Navigation is made possible as follows:

Addresses or address components which can be read explicitly in the text (see "address generation") appear visually emphasized (e.g. by underlining). If a navigation medium (e.g. mouse, visual pointing device or cursor, if necessary by tab stop) comes within the capture range of an address, the address is marked as logically combinable. This marking can be done by changing the cursor or by inserting the address (superimposition in a pop-up window or in a special status line). On confirmation by means of an OK button, the selected address is provided to a browser for selection or, respectively, for disposal.

Similarly, it is possible to insert all information contained on the page (visible, as fragment or in the non-visible area) in a pop-up menu within which it is possible to navigate by means of cursor keys or mouse (pointing device).

"Ok"—see above.

BRIEF DESCRIPTION OF THE DRAWINGS

In the text which follows, the invention will be explained with a number of illustrative embodiments, referring to the drawing, in which.

DETAILED DESCRIPTION OF THE INVENTION

Figure 1:
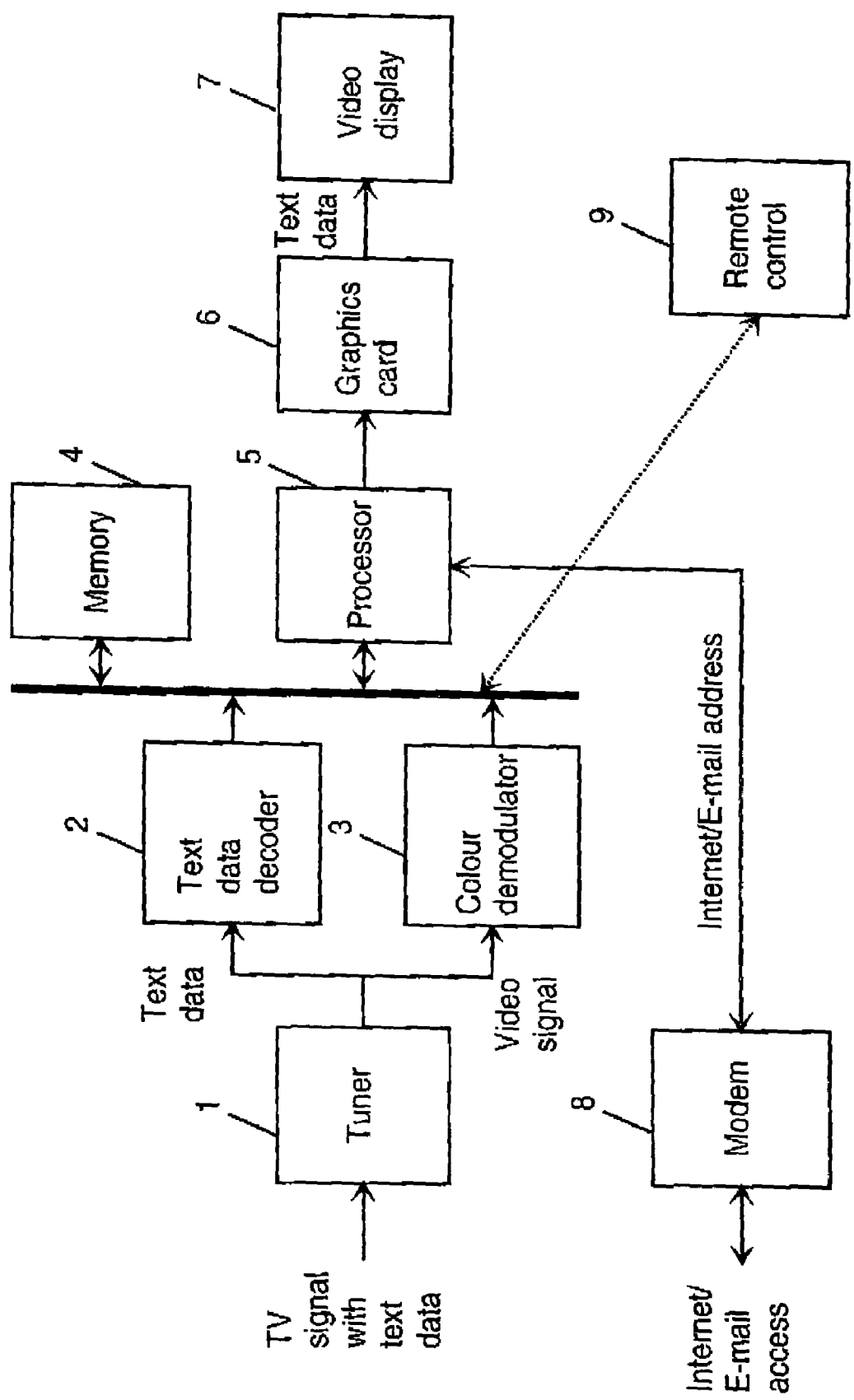
FIG. 1 shows a block diagram of an apparatus according to the invention.

FIG. 1 shows a block diagram of an apparatus according to the invention. The tuner 1 receives the satellite, cable or terrestrial signal which is then forwarded to the data decoder 2 and to the colour demodulator 3. The data then pass via a line or via a bus system to the memory 4 which contains data and programs. Furthermore, the data pass to the processor 5. The processor forwards the data obtained to the picture tube 7 via the graphics card 6. The picture tube could be constructed as television set or as monitor. The processor 5 also performs a data exchange with the modem 8 and the modem is connected to an analog or digital telephone network. The processor contains the selection unit and the control unit. The link unit is implemented by the modem 8.

If a string which is an Internet address is then displayed on the picture tube 7, the user can highlight this by means of the remote control unit 9. The remote control unit 9 is connected to the other units by wires and/or wirelessly. The address thus formed is converted by the processor in such a form that the search can begin via the modem. That is to say, the program which is stored in a memory 4 is called up by the processor in the background, the data of the Internet address are conveyed to this program and the program activates a modem for the search. The program is preferably a program which is also used for normal Internet use. It is also possible for the search routine then running to be displayed to the user on the picture tube 4. That is to say, the user sees that the address selected by him in the teletext is transferred to the program and the search mechanism is started. As soon as the address is found, the content of the page is displayed to the user. The displaying is preferably also performed in the form in which the programs for Internet or E-mails are constructed. If the user has seen enough information, he can navigate further in the Internet, simply change to teletext or also wholly to the television programme by means of the remote control unit. This makes it possible for the user to select in a simple manner an Internet or E-mail address discovered in a teletext and the result to be provided to him directly.

If the user does not highlight the address, the system independently looks for address information in the teletext page, highlights this address information and the user can let the address be searched for by means of the remote control unit. The address search and the selection is performed in the same manner as in the case of the highlighted address.

Figure 2:
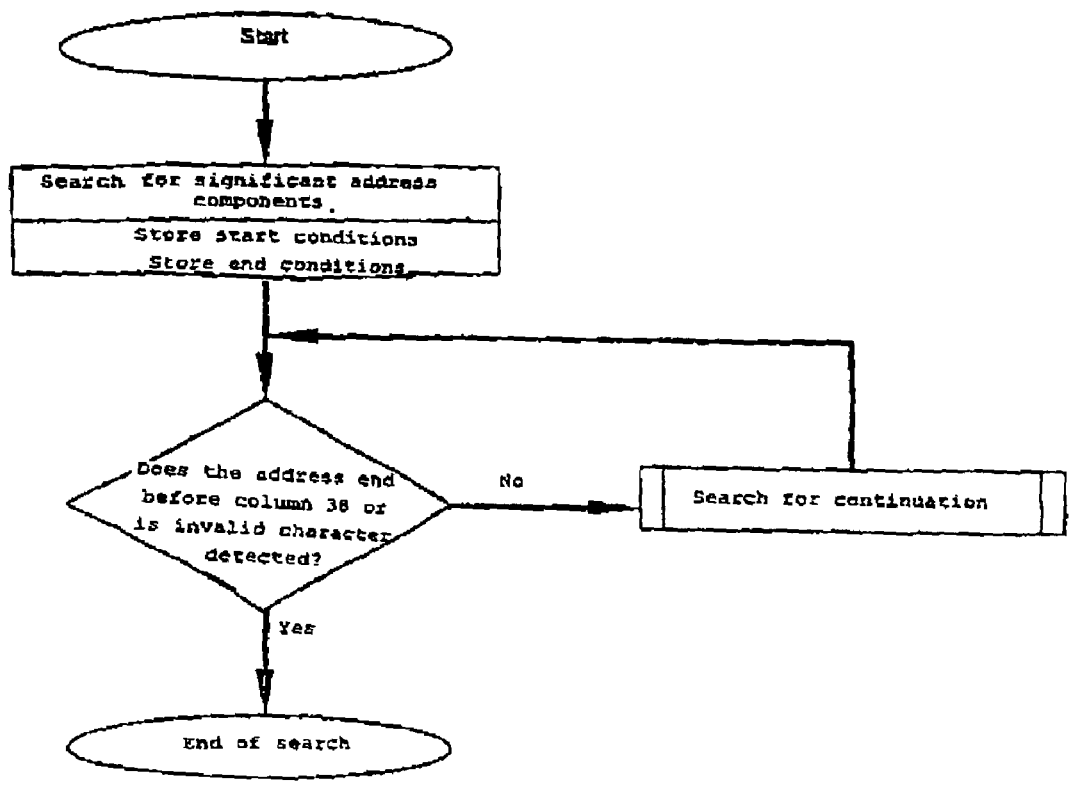
FIG. 2 shows a flow diagram of the method according to the invention.
Figure 2:
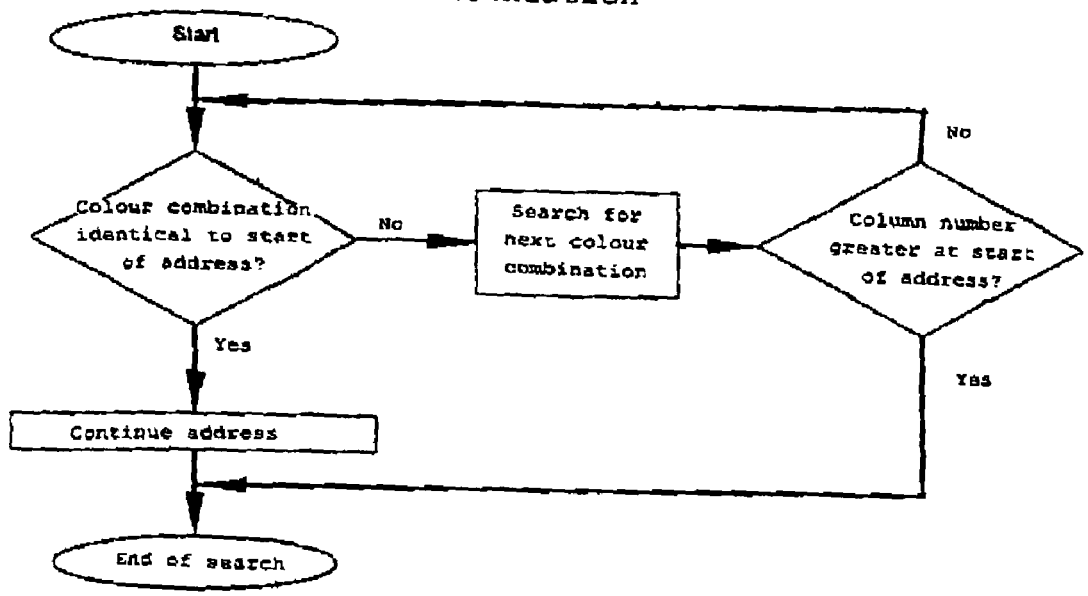

FIG. 2 shows a flow diagram of the method according to the invention. If the user does not highlight the address by means of the remote control unit, the processor PR starts a program for finding addresses. Firstly, the program looks for significant address components. These would be, for example, "http://", "www.", ".com", ".de" and others. As soon as an address meeting the start or end condition is found, it is stored. After that, a check is made whether the address ends before column 38 or an invalid character is detected. If this is the case, the search is ended and if not, the search is continued in the subroutine "continue searching". The "continue searching" subroutine compares whether the colour combination is the same as in the case of the start address. If this is the case, the contents of the column are allocated to the address and if not, the next colour combination is looked for and a check is made whether the column number is greater than in the case of the start address. If the column number is greater than the start address, the search is ended since the address will be continued in this column, at the latest. If the column number is not greater, the subroutine is run again. In this manner, the address is found since the address has the same colour continuously, as a rule. That is to say, if the address begins in one column, the colour is used for checking whether the address ends in the column or whether it is continued in the next higher or lower column. This depends on the following criteria: it is continued in the next lower column (i.e. higher column number) if the start characters of the address are found and it is continued in the next higher column (i.e. lower column number) if the end-of-address condition is found.

If both address conditions are found, i.e. start and end condition, the address can be determined by taking the start condition, end condition and the information in between and/or it is possible to recognize the entire address by means of the colour information.

What is claimed is:

1. Method for accessing a network resource comprising the steps of:

receiving textual information as part of a television based signal, wherein said textual information is at least one of closed captioning information, teletext information, and text based auxiliary information, displaying the received textual information;

analyzing the received textual information for a fraction of a network address wherein said fraction corresponds to an incomplete network resource address and is not designated as a network address;

generating a valid network resource address from said received textual information by adding at least one text string to the fraction, wherein said valid network resource address is capable of being used to access a resource via a network;

accessing a resource corresponding to said valid network resource by using said valid network resource address.

2. Method according to claim 1, further comprising the step of:

highlighting said fraction of a network address.

3. Method according to claim 1, further comprising displaying said fraction of a network address in a pop-up menu.

4. Method according to claim 1, further comprising the step of:
   automatically requesting content of said resource when only a single valid network resource address can be generated from said fraction of a network address.

5. Method according to claim 1, further comprising the step of displaying a list of a plurality of network resource addresses for selection, when one or more than one valid network resource address can be generated from said fraction of a network address.

6. Method according to claim 1, further comprising the step of:
   searching the Internet for a text string that can be added to said fraction when valid network addressed cannot be generated from said fraction.

7. Method according to claim 1, wherein said display of received textual information is performed for a first mode of operation, and said accessing the network resource corresponding to said valid network resource address is performed for a second mode of operation.

8. Method according to claim 1, further comprising the step of:
   highlighting the valid network resource address.

9. Method according to claim 1, comprising an additional step of:
   submitting the generated valid network resource address to a web browser.

10. Method according to claim 1, wherein said valid network resource address is generated without the use of a corresponding embedded link.

11. Method according to claim 1, wherein said added string of text is selected from at least one of: prefixing said fraction with a string of text associated with an Internet resource, appending said fraction with a string of text associated with a domain name, and appending said fraction with a string of text associated with a geographic location as to correspond to an address for accessing a network address.

12. Method of claim 1, comprising the additional steps of:
   transferring the fraction to a web browser, wherein an complete address is incapable of being generated; and
   searching a resource via the Internet for data capable of being used to generated a complete address corresponding to said valid network resource address.

13. Method of claim 1, comprising the additional steps of:
   generating a list of valid network resource addresses when two or more complete network resources addresses may be generated from said fraction; and
   selecting a network address resource address from said list of valid network resource addresses.

14. Method of claim 13, comprising the additional step of:
   submitting the selected network resource address to a web browser.

15. The method of claim 1, wherein said received textual information data is transmitted as auxiliary information in said television based signal.

16. Apparatus for accessing resources resident at a network node be designated by a given network address comprising:
   means for receiving textual information as part of a television based signal comprised in at least one of: a satellite, cable, and terrestrial signal, wherein said textual information is at least one of closed captioning information, teletext information, and text based auxiliary information;
   means for providing the received textual information to a display;
   means for determining a fraction of a network address information as being part of said textual information, wherein said fraction corresponds to an incomplete network resource address and said fraction is not designated as a network address; and
   means for remotely accessing a network resource corresponding to the generated network resource designator by using said fraction of a network address to form a network address corresponding to said network resource.

17. Method for accessing a network comprising the steps of:
   receiving textual information as part of a video based signal, wherein said textual information is at least one of closed captioning information, teletext information, and text based auxiliary information,
   displaying the received textual information;
   generating a valid network resource address from said received textual information by adding at least one string to said received textual information when said textual information lacks a designator that is used to form an address for accessing a resource via a network, wherein said valid network resource address when generated is capable of being used to access a resource via a network;
   accessing a resource corresponding to said valid network resource by using said valid network resource address.

* * * * *